(12) United States Patent
Hsu

(10) Patent No.: US 6,962,314 B2
(45) Date of Patent: Nov. 8, 2005

(54) MULTIFUNCTIONAL HOLDER

(75) Inventor: Fu-Lu Hsu, Chang Hua Hsien (TW)

(73) Assignee: Luh Da Industry Corp., Chang Hua Hsien (TW)

( * ) Notice: Subject to any disclaimer, the term of this patent is extended or adjusted under 35 U.S.C. 154(b) by 1 day.

(21) Appl. No.: 10/755,881

(22) Filed: Jan. 12, 2004

(65) Prior Publication Data

US 2005/0151039 A1    Jul. 14, 2005

(51) Int. Cl.[7] .................. F16B 47/00; A47B 96/06
(52) U.S. Cl. .................. 248/205.5; 248/230.6; 248/231.71; 248/363; 248/683
(58) Field of Search .................. 248/205.5, 205.8, 248/206.2, 206.1, 205.6, 230.6, 231.71, 309.3, 248/314, 316.1, 206.3, 206.4, 205.9, 205.7, 248/362, 363, 683, 689

(56) References Cited

U.S. PATENT DOCUMENTS

| | | | | |
|---|---|---|---|---|
| 121,089 A | * | 11/1871 | Dennison | 248/231.71 |
| 937,480 A | * | 10/1909 | Smith et al. | 248/231.71 |
| 1,211,527 A | * | 1/1917 | Berndt | 108/8 |
| 1,335,308 A | * | 3/1920 | Wilson | 248/316.1 |
| 1,494,971 A | * | 5/1924 | Peters | 248/316.1 |
| 2,148,307 A | * | 2/1939 | Scott | 248/231.71 |
| 2,510,198 A | * | 6/1950 | Tesmer | 248/229.25 |
| 2,568,266 A | * | 9/1951 | Arnold | 248/205.6 |
| 2,683,640 A | * | 7/1954 | Mangine | 248/231.71 |
| 3,020,017 A | * | 2/1962 | Watson | 248/205.8 |
| 3,180,605 A | * | 4/1965 | Ewaskowitz, Jr. | 248/231.85 |
| 3,503,430 A | * | 3/1970 | Tsurumoto | 411/147 |
| 3,508,732 A | * | 4/1970 | Trachtenberg et al. | 248/231.71 |
| 4,580,751 A | * | 4/1986 | Panzer | 248/205.8 |
| 4,813,640 A | * | 3/1989 | Perentin | 248/205.8 |
| 5,326,059 A | * | 7/1994 | Pryor et al. | 248/231.71 |
| 5,626,320 A | * | 5/1997 | Burrell et al. | 248/230.6 |
| 5,664,750 A | * | 9/1997 | Cohen | 248/231.71 |
| 6,202,265 B1 | * | 3/2001 | Caine | 24/453 |
| 6,308,923 B1 | * | 10/2001 | Howard | 248/205.5 |
| 6,550,735 B1 | * | 4/2003 | Zheng | 248/304 |
| 6,705,578 B2 | * | 3/2004 | Mulford et al. | 248/187.1 |
| 6,758,449 B1 | * | 7/2004 | Chen et al. | 248/146 |

* cited by examiner

Primary Examiner—Anita King
Assistant Examiner—Tan Le
(74) Attorney, Agent, or Firm—Alan D. Kamrath; Nikolai & Mersereau, P.A.

(57) ABSTRACT

A holder includes a base having a disk and a combination seat, an elastic plate mounted on the disk and having a protruding elastic portion, a sucker mounted on a bottom of the disk and having a shaft extended through the through hole of the disk and the slot of the elastic plate, and an actuating handle having an enlarged head pivotally mounted on the shaft and urged on the elastic portion of the elastic plate. Thus, the holder is assembled and disassembled easily and conveniently, thereby facilitating the user mounting the holder. In addition, the holder is assembled rigidly and stably, so that the holder will not become loosened during a long-term utilization, thereby facilitating the user using the holder.

13 Claims, 10 Drawing Sheets

MULTIFUNCTIONAL HOLDER

BACKGROUND OF THE INVENTION

1. Field of the Invention

The present invention relates to a holder, and more particularly to a multifunctional holder that is used to support an article rigidly and stably.

2. Description of the Related Art

A conventional holder is used for supporting an article, such as a note, a document file, or the like, on a table by the greater weight of the holder. However, the conventional holder cannot support the article rigidly and stably by its own weight, so that the holder easily falls down due to an unintentional touch or hit, thereby causing inconvenience to the user.

SUMMARY OF THE INVENTION

The primary objective of the present invention is to provide a holder assembled and disassembled easily and conveniently, thereby facilitating the user mounting the holder.

Another objective of the present invention is to provide a holder that is assembled rigidly and stably, so that the holder will not become loosened during a long-term utilization, thereby facilitating the user using the holder.

A further objective of the present invention is to provide a multifunctional holder that is used to hold different articles at different sites, thereby enhancing the versatility of the holder.

In accordance with the present invention, there is provided a holder, comprising:

a base including a disk, and a combination seat extended outward from a side of the disk;

the disk of the base has a top having a center formed with a plane having a center formed with a through hole;

the combination seat of the base has an inside formed with an insertion hole and an insertion bore communicating with the insertion hole, and has a peripheral wall formed with a fixing hole communicating with the insertion bore;

an elastic plate mounted on the plane of the disk and having a center formed with a protruding elastic portion formed with a slot;

a sucker mounted on a bottom of the disk and having a top face having a center provided with an outward extending shaft extended through the through hole of the disk and the slot of the elastic plate; and an actuating handle mounted on the shaft of the sucker and having a first end formed with an enlarged head pivotally mounted on the shaft of the sucker and urged on the elastic portion of the elastic plate.

Further benefits and advantages of the present invention will become apparent after a careful reading of the detailed description with appropriate reference to the accompanying drawings.

DETAILED DESCRIPTION OF THE INVENTION

Figure 1:
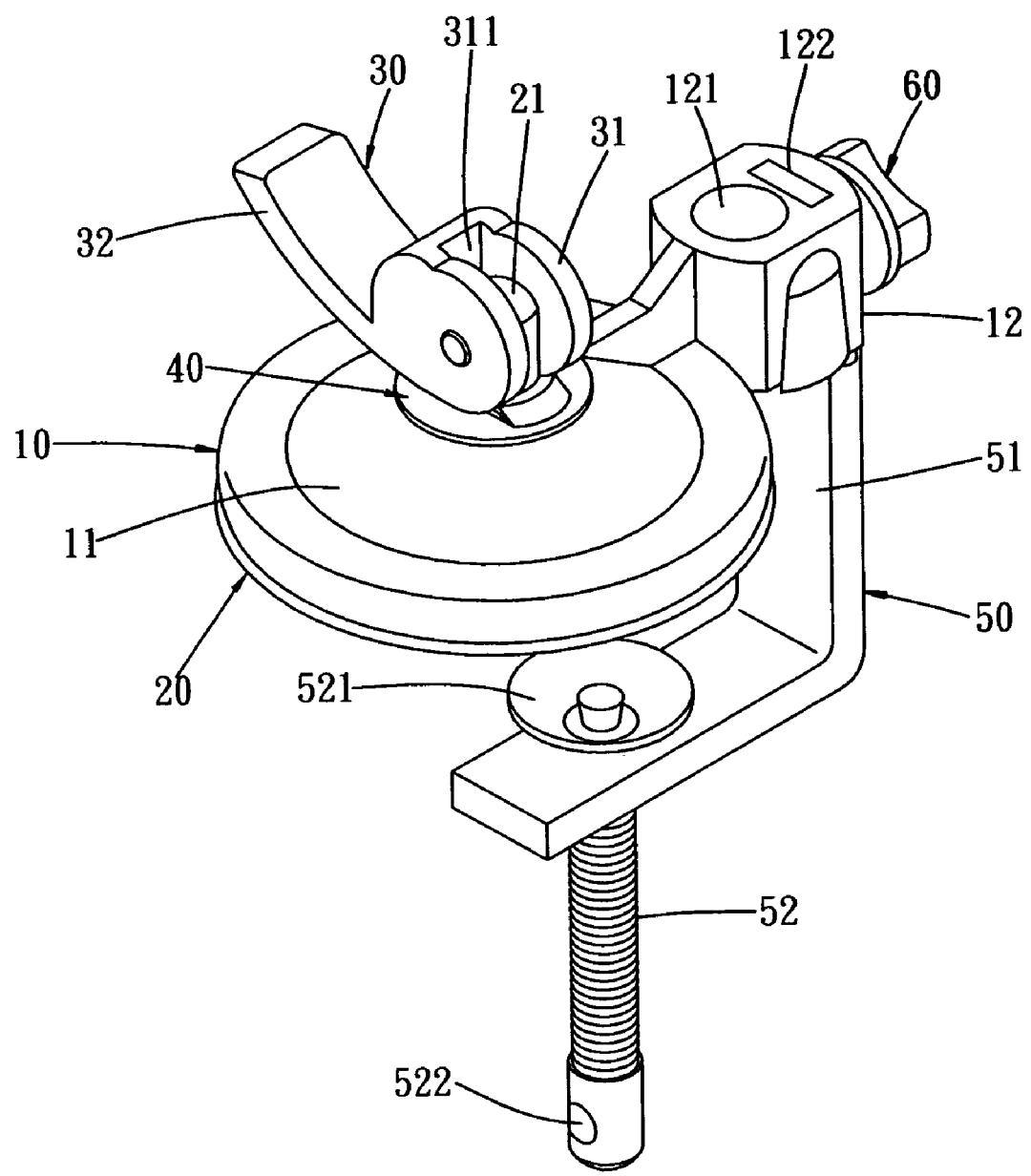
FIG. 1 is a perspective view of a holder in accordance with the preferred embodiment of the present invention.
Figure 2:
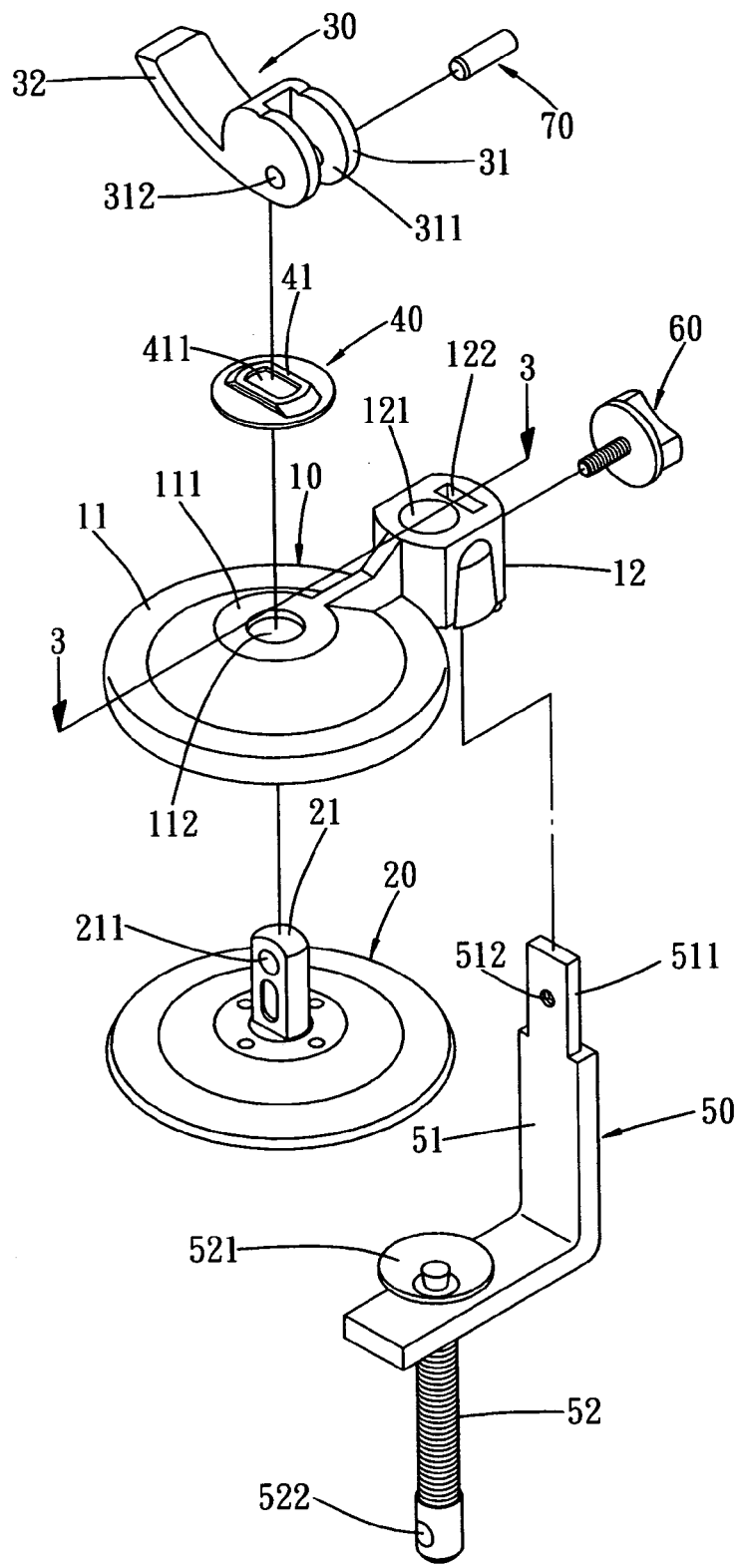
FIG. 2 is an exploded perspective view of the holder as shown in FIG. 1.
Figure 4:
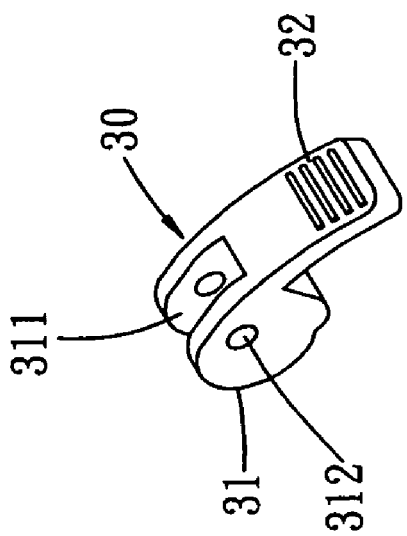
FIG. 4 is a perspective view of an actuating handle of the holder as shown in FIG. 2.
Figure 3:
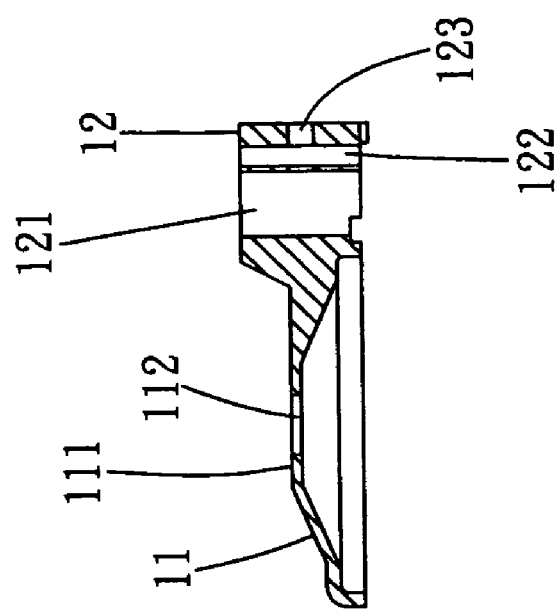
FIG. 3 is a plan cross-sectional view of a disk of the holder taken along line 3—3 as shown in FIG. 2.

Referring to the drawings and initially to FIGS. 1–4, a multifunctional holder in accordance with the preferred embodiment of the present invention comprises a base 10, a sucker 20, an actuating handle 30, an elastic plate 40, a clamp 50, and a rotation bolt 60.

The base 10 includes a disk 11, and a combination seat 12 extended outward from a side of the disk 11. The disk 11 of the base 10 has a top having a center formed with a plane 111 having a center formed with a through hole 112. The combination seat 12 of the base 10 has an inside formed with a circular insertion hole 121 and a rectangular insertion bore 122 communicating with the insertion hole 121, and has a peripheral wall formed with a fixing hole 123 (see FIG. 3) communicating with the insertion bore 122.

The sucker 20 has a top face having a center provided with an outward extending shaft 21 having a distal end formed with a pivot hole 211. The shaft 21 of the sucker 20 has a substantially rectangular cross section.

The actuating handle 30 has a first end formed with an enlarged head 31 and a second end formed with a drive portion 32. The enlarged head 31 of the actuating handle 30 has an inside formed with an opening 311 and has two opposite side walls each formed with an eccentrically arranged pivot hole 312 communicating with the opening 311.

The elastic plate 40 has a center formed with a protruding elastic portion 41 by a punching process. The elastic portion 41 of the elastic plate 40 is formed with a slot 411 having a shape mating with that of the shaft 21 of the sucker 20.

The clamp 50 includes a substantially L-shaped support rack 51 having a first section formed with an insert 511, and a threaded urging rod 52 mounted on a second section of the support rack 51. The insert 511 of the clamp 50 has a shape mating with that of the insertion bore 122 of the base 10 and is formed with a screw bore 512. The urging rod 52 of the clamp 50 is extended through the second section of the support rack 51 and has a first end provided with an urging disk 521 and a second end formed with a through hole 522.

In assembly, the elastic plate 40 is mounted on the plane 111 of the disk 11. Then, the shaft 21 of the sucker 20 is extended through the through hole 112 of the disk 11 and the slot 411 of the elastic plate 40, so that the sucker 20 is rested on a bottom of the disk 11. Then, the actuating handle 30 is mounted on the shaft 21 of the sucker 20, with the shaft 21 of the sucker 20 being inserted into the opening 311 of the actuating handle 30. Then, a pivot pin 70 is extended through the eccentric pivot holes 312 of the enlarged head 31 and the pivot hole 211 of the shaft 21, so that the enlarged head 31 of the actuating handle 30 is pivotally mounted on the shaft 21 of the sucker 20 and is urged on the elastic portion 41 of the elastic plate 40. Then, the insert 511 of the clamp 50 is inserted into the insertion bore 122 of the combination seat 12, and the rotation bolt 60 is extended through the fixing hole 123 of the combination seat 12 and screwed into the screw bore 512 of the insert 511, thereby assembling the holder as shown in FIG. 1.

Figure 5:
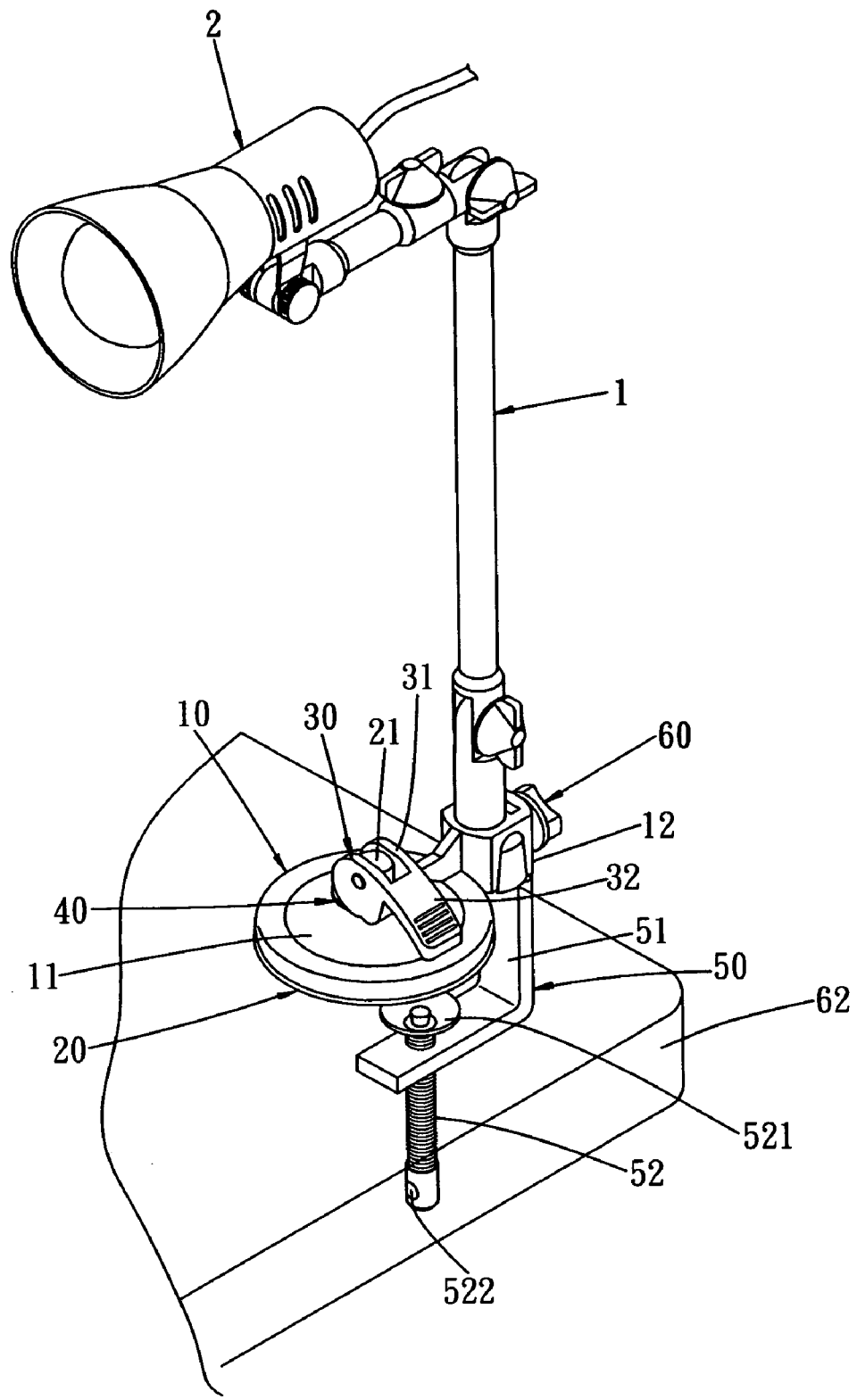
FIG. 5 is a partially cut-away perspective view showing usage of the holder in accordance with the preferred embodiment of the present invention.

Referring to FIG. 5 with reference to FIGS. 1–4, a pivotable post 1 is mounted on the combination seat 12 of the base 10 and has a lower end inserted into the insertion hole 121 of the combination seat 12. Thus, the post 1 is combined with a table lamp 2, a fan, a document file, a microphone, a detector, a network camera or the like. Then, the rotation bolt 60 is rotated on the combination seat 12 of the base 10 so that the distal end of the rotation bolt 60 is locked in and urged on an annular groove (not shown) formed in the lower end of the post 1. Then, the sucker 20 is mounted on a table 62, and the actuating handle 30 is pivoted on the shaft 21 of the sucker 20 in an eccentric manner, so that the enlarged head 31 of the actuating handle 30 is urged on the elastic portion 41 of the elastic plate 40, and the sucker 20 is pulled upward by the shaft 21, thereby deforming the sucker 20 whose center is protruded outward to produce a stronger attractive force to bond the sucker 20 on the table 62. Then, the urging rod 52 of the clamp 50 is rotated to move the urging disk 521 upward to press the bottom of the table 62, so that the table lamp 2 is mounted on the table 62 by the holder.

Figure 6A:
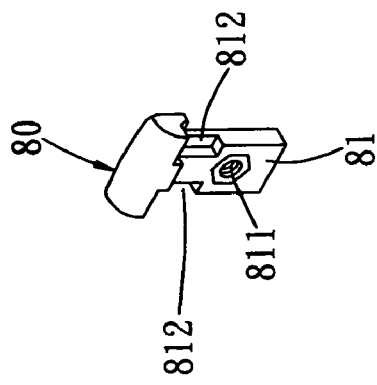
FIG. 6A is a perspective view of an insertion member of the holder as shown in FIG. 6.
Figure 6:
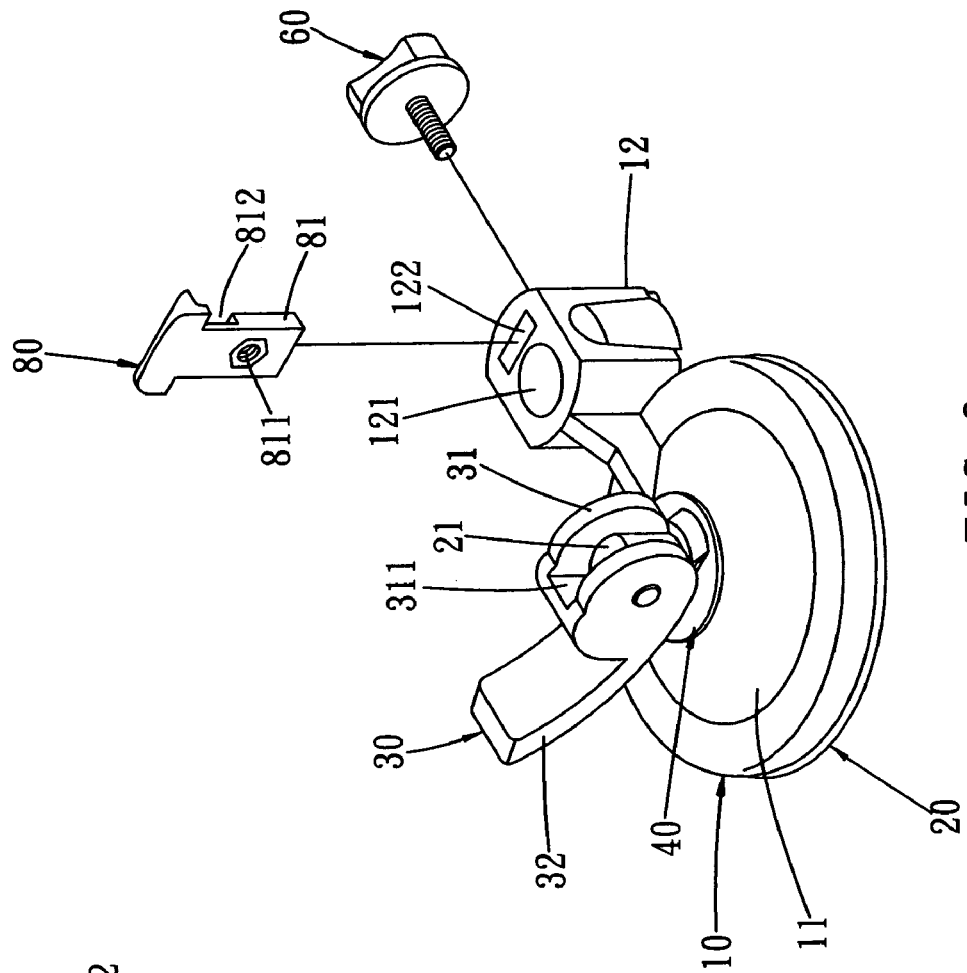
FIG. 6 is a partially exploded perspective view of a holder in accordance with another embodiment of the present invention.

Referring to FIGS. 6 and 6A with reference to FIGS. 1–4, the clamp 50 is removed, and the holder further comprises an insertion member 80 mounted on the combination seat 12 of the base 10 and having a first end formed with an insertion section 81 inserted into the insertion bore 122 of the combination seat 12, and a second end formed with two opposite locking grooves 812. The insertion section 81 of the insertion member 80 has a shape mating with that of the insertion bore 122 of the base 10 and is formed with a screw bore 811. In assembly, the rotation bolt 60 is extended through the fixing hole 123 of the combination seat 12 and screwed into the screw bore 811 of the insertion member 80.

Figure 7:
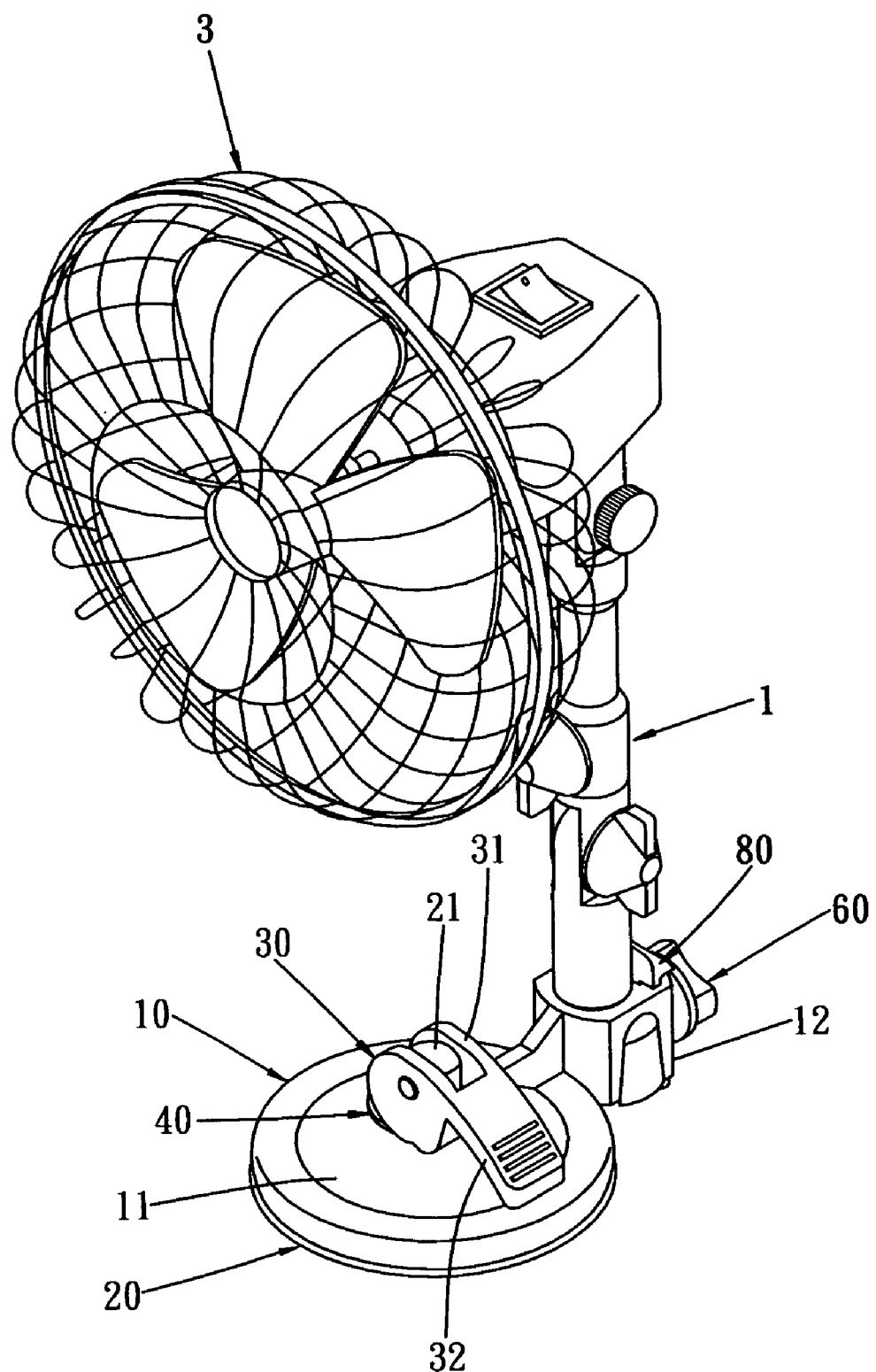
FIG. 7 is a perspective assembly view showing usage of the holder as shown in FIG. 6.

Referring to FIG. 7 with reference to FIG. 6, the holder is used to support a fan 3.

Figure 8:
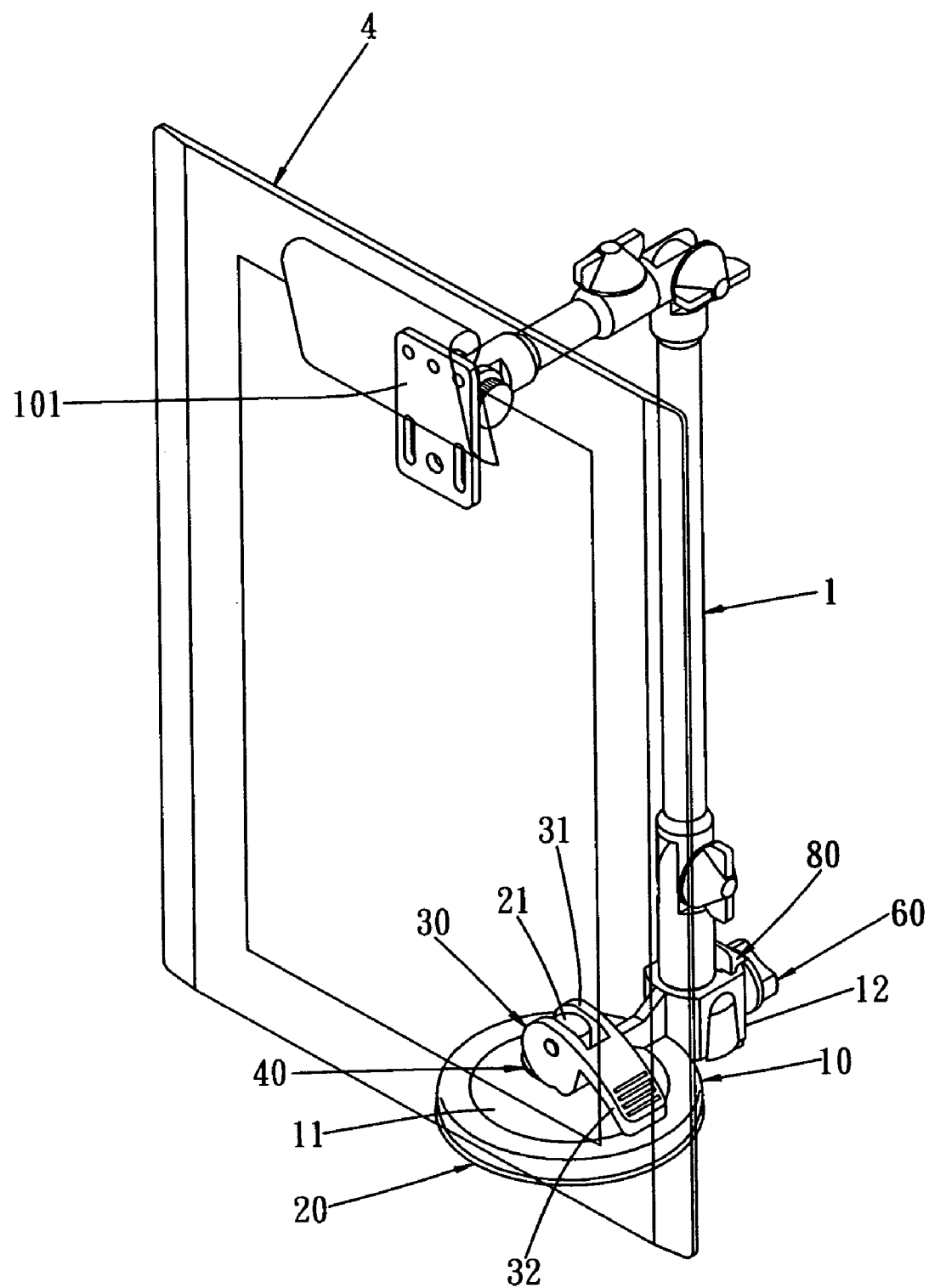
FIG. 8 is a perspective assembly view showing usage of the holder as shown in FIG. 6.

Referring to FIG. 8 with reference to FIG. 6, the holder is used to support a document file 4 which is mounted on the post 1 by a connecting seat 101.

Figure 9:
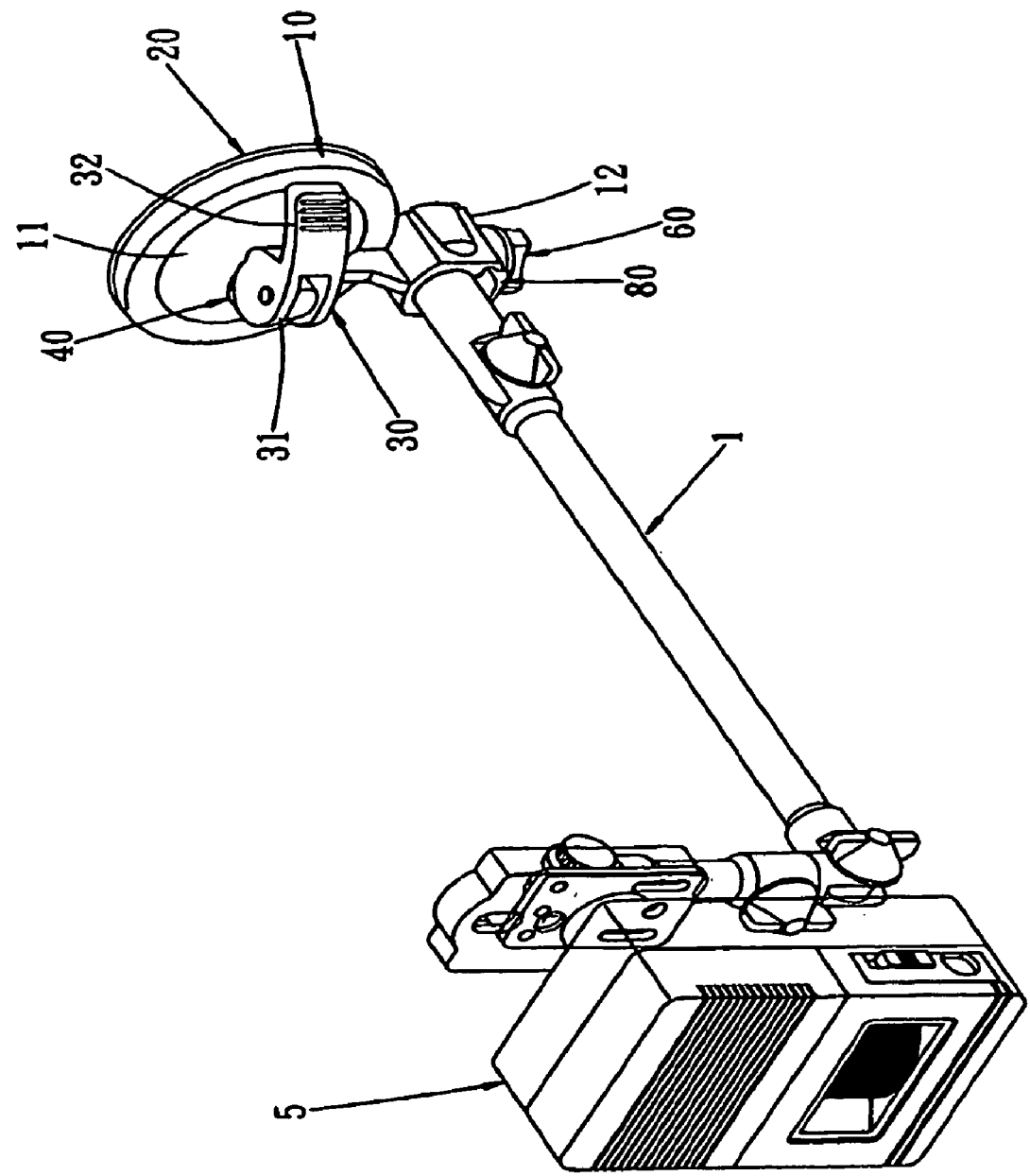
FIG. 9 is a perspective assembly view showing usage of the holder as shown in FIG. 6.

Referring to FIG. 9 with reference to FIG. 6, the holder is used to support a detector 5.

Figure 10:
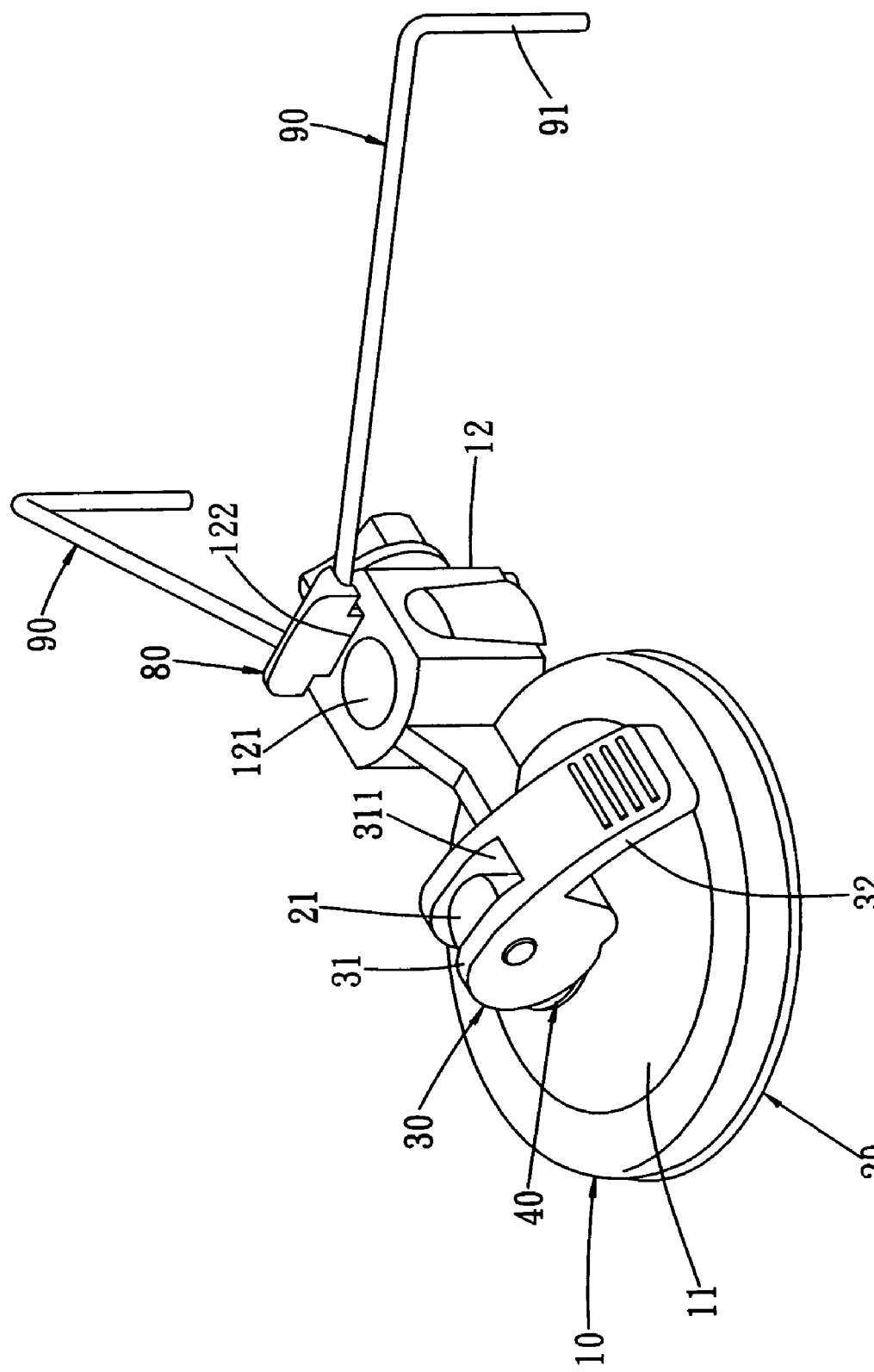
FIG. 10 is a perspective view of a holder in accordance with another embodiment of the present invention.
Figures 11, 11A:
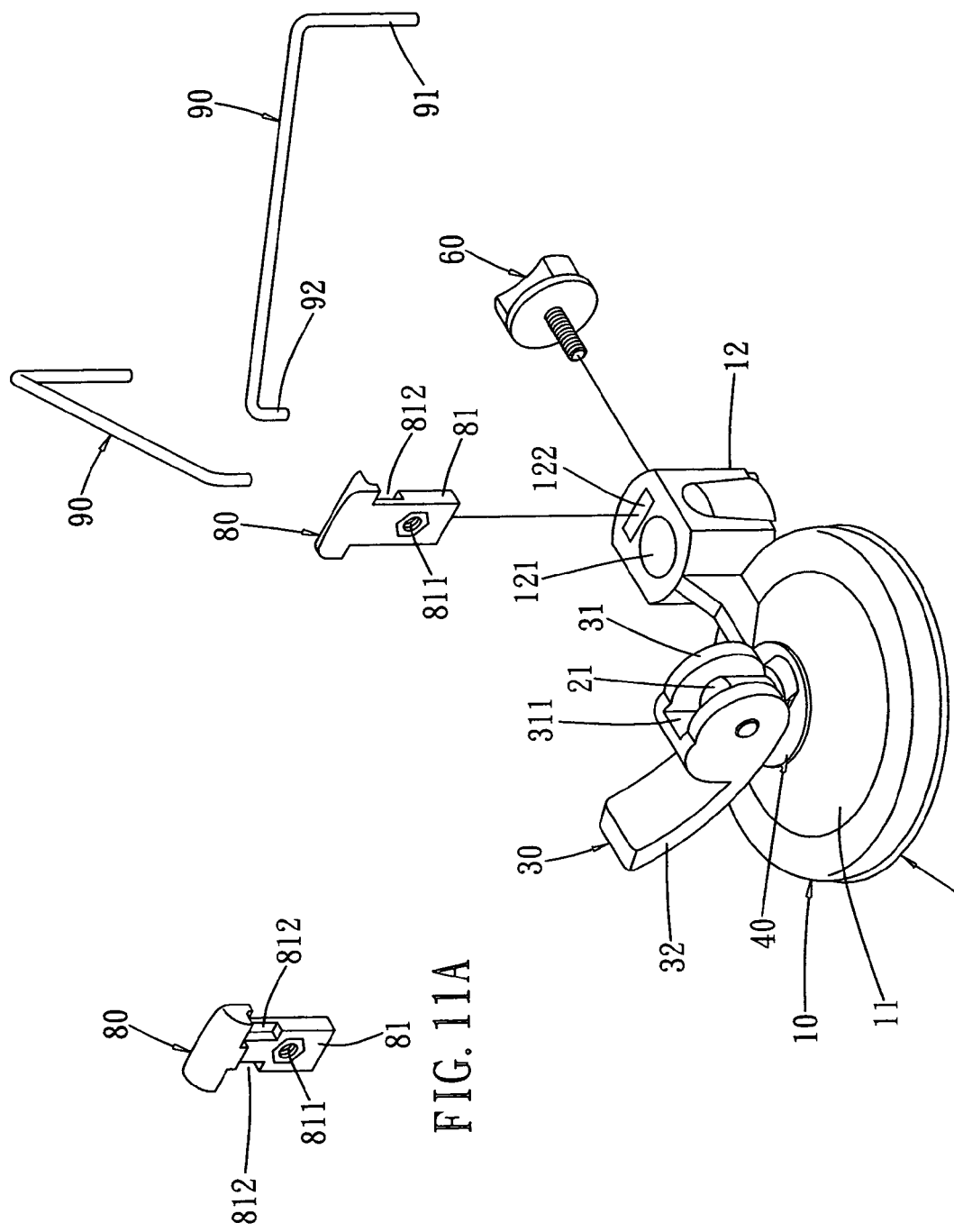
FIG. 11 is an exploded perspective view of the holder as shown in FIG. 10.
FIG. 11A is a perspective view of an insertion member of the holder as shown in FIG. 11.

Referring to FIGS. 10, 11 and 11A with reference to FIG. 6, the holder further comprises two support bars 90 each mounted between the insertion member 80 and the combination seat 12 of the base 10 and each having a first end formed with a first bent leg 92 mounted in a respective one of the two locking grooves 812 of the insertion member 80 and inserted into the insertion bore 122 of the combination seat 12. Each of the two support bars 90 has a second end formed with a second bent leg 91. Thus, the two support bars 90 form an included angle to provide an auxiliary support effect.

Accordingly, the holder is assembled and disassembled easily and conveniently, thereby facilitating the user mounting the holder. In addition, the holder is assembled rigidly and stably, so that the holder will not become loosened during a long-term utilization, thereby facilitating the user using the holder. Further, the holder is used to hold different articles at different sites, thereby enhancing the versatility of the holder.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A holder, comprising:
    a base including a disk, and a combination seat extended outward from a side of the disk;
    the disk of the base has a top having a center formed with a plane having a center formed with a through hole;
    the combination seat of the base has an inside formed with an insertion hole and an insertion bore communicating with the insertion hole, and has a peripheral wall formed with a fixing hole communicating with the insertion bore;
    an elastic plate mounted on the plane of the disk and having a center formed with a protruding elastic portion formed with a slot;
    a sucker mounted on a bottom of the disk and having a top face having a center provided with an outward extending shaft extended through the through hole of the disk and the slot of the elastic plate; and
    an actuating handle mounted on the shaft of the sucker and having a first end formed with an enlarged head pivotally mounted on the shaft of the sucker and urged on the elastic portion of the elastic plate; wherein
    the holder further comprises a clamp mounted on the combination seat of the base and including a substantially L-shaped support rack having a first section formed with an insert inserted into the insertion bore of the combination seat, and a threaded urging rod mounted on a second section of the support rack;
    the insert of the clamp is formed with a screw bore, and the holder further comprises a rotation bolt extended through the fixing hole of the combination seat and screwed into the screw bore of the insert;
    the holder further comprises a pivotable post mounted on the combination seat of the base and having a lower end inserted into the insertion hole of the combination seat, wherein the rotation bolt has a distal end locked in and urged on a lower end of the post.

2. The holder in accordance with claim 1, wherein the slot of the elastic plate has a shape mating with that of the shaft of the sucker.

3. The in accordance with claim 1, wherein the shaft of the sucker has a distal end formed with a pivot hole, the enlarged head of the actuating handle has two opposite side walls each formed with an eccentrically arranged pivot hole, and the holder further comprises a pivot pin extended through the eccentric pivot holes of the enlarged head and the pivot hole of the shaft.

4. The holder in accordance with claim 1, wherein the shaft of the sucker has a substantially rectangular cross section.

5. The holder in accordance with claim 1, wherein the actuating handle has a second end formed with a drive portion.

6. The holder in accordance with claim 1, wherein the actuating handle has an inside formed with an opening for mounting the shaft of the sucker.

7. The holder in accordance with claim 1, wherein the insert of the clamp has a shape mating with that of the insertion bore of the base.

8. A holder, comprising:
 a base including a disk, and a combination seat extended outward from a side of the disk;
 the disk of the base has a top having a center formed with a plane having a center formed with a through hole;
 the combination seat of the base has an inside formed with an insertion hole and an insertion bore communicating with the insertion hole, and has a peripheral wall formed with a fixing hole communicating with the insertion bore;
 an elastic plate mounted on the plane of the disk and having a center formed with a protruding elastic portion formed with a slot;
 a sucker mounted on a bottom of the disk and having a top face having a center provided with an outward extending shaft extended through the through hole of the disk and the slot of the elastic plate; and
 an actuating handle mounted on the shaft of the sucker and having a first end formed with an enlarged head pivotally mounted on the shaft of the sucker and urged on the elastic portion of the elastic plate;
 wherein
 the holder further comprises a clamp mounted on the combination seat of the base and including a substantially L-shaped support rack having a first section formed with an insert inserted into the insertion bore of the combination seat, and a threaded urging rod mounted on a second section of the support rack;
 the urging rod of the clamp is extended through the second section of the support rack and has a first end provided with an urging disk facing the sucker and a second end formed with a through hole.

9. The holder in accordance with claim 1, further comprising an insertion member mounted on the combination seat of the base and having a first end formed with an insertion section inserted into the insertion bore of the combination seat, and a second end formed with two opposite locking grooves.

10. The holder in accordance with claim 9, wherein the insertion section of the insertion member is formed with a screw bore, and the holder further comprises a rotation bolt extended through the fixing hole of the combination seat and screwed into the screw bore of the insertion section.

11. The holder in accordance with claim 9, wherein the insertion section of the insertion member has a shape mating with that of the insertion bore of the base.

12. The holder in accordance with claim 9, further comprising two support bars each mounted between the insertion member and the combination seat of the base and each having a first end formed with a first bent leg mounted in a respective one of the two locking grooves of the insertion member and inserted into the insertion bore of the combination seat.

13. The holder in accordance with claim 12, wherein each of the two support bars has a second end formed with a second bent leg.

* * * * *